Oct. 19, 1937.  K. HENGERER  2,096,326
MOLDING PLANT
Filed Oct. 3, 1931

Inventor
Karl Hengerer
by Karl Hengerer
Atty.

Patented Oct. 19, 1937

2,096,326

UNITED STATES PATENT OFFICE 2,096,326

MOLDING PLANT

Karl Hengerer, Stuttgart, Germany

Application October 3, 1931, Serial No. 566,703
In Germany October 6, 1930

3 Claims. (Cl. 25—2)

My invention relates to a molding plant for manufacturing panelling plates for skeleton structures.

It is an object of my invention to provide a molding plant which operates at a faster rate than molding plants as designed heretofore. To this end, I combine with the mold, or preferably with a press including a set of molds, a pre-molding tank in which the material or mixture for the panels is prepared for the molding operation proper. Preferably, the tank is arranged for centrifugal action, and its size is proportioned to the size of the mold.

The combination of a, preferably centrifugal, tank for preparing the material or mixture, with a mold for finishing the mixture, has the advantage that the operation of the plant is speeded up. The mixture settles or sags in the tank, and this settling or sagging is particularly effective if the tank is of the centrifugal type. The mixture is subjected to a preliminary treatment in the tank, and the mold or press is relieved of part of its work. Such preliminary treatment is particularly useful if the mixture contains fillers of large volume, such as wood wool, wrack, straw, sawdust, etc. Panels containing such materials must remain in the mold and under pressure until the mixture has become solidified. By the preliminary treatment, and particularly by centrifugal action in a rotary tank, mixtures containing such binders are caused to settle and to sag, and the settled or sagged mixture assumes a shape in the tank which, to a certain extent, is adapted to the shape and size of the mold. The mold is thereby relieved of the work which is performed during the preliminary treatment already, and the period during which the mixture must be treated in the mold, is shortened in proportion, as against a mold which is called upon to perform all the work on the mixture.

The panelling plates manufactured in my novel plant, serve for building up outer and inner walls of buildings in combination with a skeleton of vertical posts and horizontal crossbars, battens supported by the posts, and horizontal and vertical rods which are supported by the skeleton and inserted in corresponding grooves in the jointing faces of the panelling plates.

According to my invention, a plant is provided for the manufacture, on a quantity production basis, of cheap panelling plates for outer and inner walls. The plant is equipped with a molding machine or press with not less than one mold which has a frame, a movable plate adapted to penetrate into the frame, and means for exerting pressure on the plate.

In a preferred embodiment of my invention, I provide a press including a set of molds, each comprising a frame, movable top and bottom plates adapted to penetrate into the frames and bars which are adapted to bear on the top and bottom plates, and I further provide means for exerting pressure on the frames through the bars, so that the top and bottom plates penetrate into the frames of the molds and exert pressure on the material in the frames.

By means of the molding machine described I obtain hardened panelling plates to which the desired section is imparted by simple pressing, and which preferably have cavities.

My plant, as mentioned, is particularly designed for the manufacture of panelling plates which consist of a filler or fillers of material whose effective volume is large as compared with their real volume, and a binder. In the molding of such panelling plates without preparation in the tank referred to, it would be necessary to exert a pressure of comparatively long duration while the material is in the mold, as otherwise the resiliency of the filler or fillers is not overcome. Therefore, while it is necessary that the pressure should be exerted until the material in the mold, or molds, has hardened, it is not desirable that the complete treatment of the material should be performed in a mold, or in the several molds of a press. According to my invention, the panelling plates are only finished in the mold, or the molds of the press, while the preparatory treatment is performed in the tank.

In the drawing affixed to this specification and forming part thereof, a molding machine or press and a mixing tank for a plant embodying my invention are illustrated diagrammatically by way of example.

Figure 1:
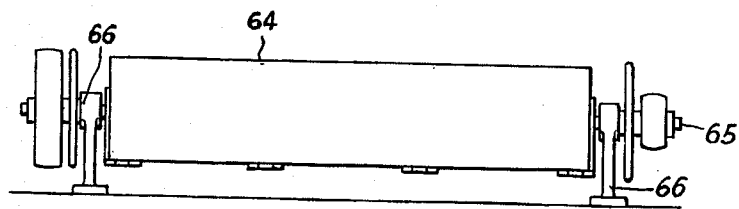
Fig. 1 is an elevation of a mixing tank for the plant.

Referring now to the drawing, and first to Fig. 1, the mixing tank 64 is of the centrifugal type, being a drum with a perforated barrel mounted on a shaft 65 in suitable bearings 66. The filler which, as mentioned, may be wood wool, wrack, etc., is placed in the tank or drum 64 while the molding press is in operation on another charge of the same, or similar material, the binder is added and mixed with the filler and the prepared material is discharged into the molds of the press. The preparation tank 64 is preferably made of the same length as the molds in order to prevent longitudinal spreading of the filler in the molds and to effect distribution in lateral direction only. The tank 64 may be charged with the filler, for instance wood wool, already at the station where the wood wool is produced and then be moved to the station where the binder is produced, and where the binder is mixed with the filler by suitable agitation. If the binder has the constitution of pulp the excess of binder is removed by centrifugal action. The percentage of binder in the mold must not be too high for an insulating plate will obviously be the more efficient, the greater its porosity.

If the tank is a plain trough, (not shown) the excess of binder is allowed to flow over the sides and ends of the trough.

Figure 2:
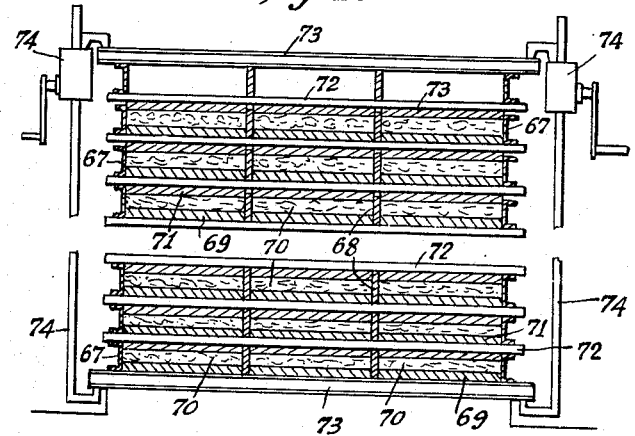
Fig. 2 is a partly sectional elevation of a press for molding the material mixed in the tank, into finished and solidified panelling plates.
Figure 3:
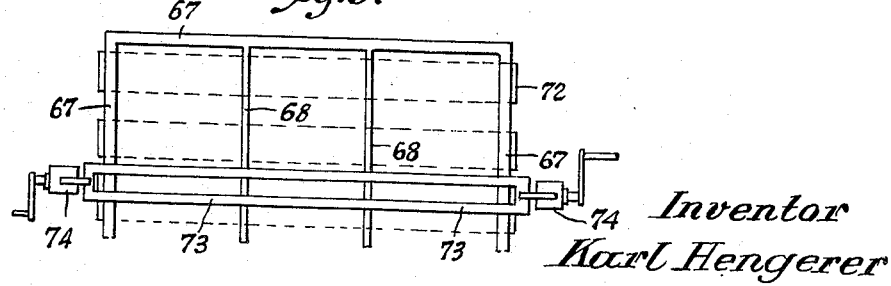
Fig. 3 is a plan view showing a portion of the press illustrated in Fig. 2.

A molding press for the plant embodying my invention is shown in Figs. 2 and 3. The press comprises a set of channel-section frames 67 which are equipped with bottom boards 69, top boards 71, horizontal bars 72 and vertical partitions 68. The top boards 71 in the initial position illustrated in the upper portion of Fig. 2 project from the frames 62 for a distance corresponding to the depth to which the material is compressed. 73 are beams at the top and at the bottom of the molds, and 74 are compressors, for instance, rack-and-pinion mechanisms, for forcing the bottom boards 71 into the molds until all horizontal bars 72 bear on the upper edges of the frames. In the lower portion of Fig. 2 the material in the molds is shown in compressed condition.

The preparation of the mixture in the mixing or preparation tank 64 has already been described. The length and capacity of the mixing tank 64 are preferably so proportioned to the corresponding data of the mold, or, in the case of a press as described, of the individual molds, that the filler is not stretched longitudinally in the mold, or molds, but is only spread out in transverse direction. The filler, say, wood wool, may be placed in the tank 64 at the station where it is available and transported, in the tank, to the station where the binder is available. The filler and binder are mixed in the tank 64 by suitable agitation, and are then transported to the press. If the binder is a pulp, any excess of binder flows from the tank 64 on the way to the press, but, if necessary, the tank may also be rotated for removing the excess by centrifugal action. The mixture is then charged into the molds of the press. In this manner, the material is prepared and transported to the press while the press is finishing the preceding set of plates.

I wish it to be understood that I do not desire to be limited to the exact details of construction shown and described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A molding plant for the manufacture of panelling plates from a mixture of wood wool and an hydraulic binder comprising a premolding tank and a press mold substantially equal in length to said tank, in which the materials premolded in said tank are compressed to form plates.

2. A molding plant for the manufacture of panelling plates from a mixture of wood wool and an hydraulic binder comprising a premolding tank with perforated walls, and a press mold substantially equal in length to said tank, in which the materials premolded in said tank are compressed to form plates.

3. A molding plant for the manufacture of panelling plates from a mixture of wood wool and an hydraulic binder comprising a centrifugal premolding tank adapted to remove excess of cement and liquid from the material to be molded and a press mold substantially equal in length to said tank, in which the materials premolded in said tank are compressed to form plates.

KARL HENGERER.